United States Patent [19]

Shuttleworth

[11] 4,247,458

[45] Jan. 27, 1981

[54] PROCESS FOR PREPARING AZO DYES

[75] Inventor: Leslie Shuttleworth, Ormskirk, England

[73] Assignee: Eastman Kodak Company, Rochester, N.Y.

[21] Appl. No.: 10,348

[22] Filed: Feb. 8, 1979

[30] Foreign Application Priority Data

Nov. 30, 1978 [GB] United Kingdom ............... 46612/78

[51] Int. Cl.$^3$ ...................... C09B 29/22; C09B 29/36
[52] U.S. Cl. .................................... 260/158; 260/152; 260/162; 260/196; 260/205; 260/206; 260/207; 260/207.1
[58] Field of Search ............... 260/158, 152, 162, 196, 260/205

[56] References Cited

U.S. PATENT DOCUMENTS 4,153,343  5/1979  Bloom et al. ..................... 260/158 X
4,153,607  5/1979  Eilingsfeld et al. .............. 260/158 X Primary Examiner—Paul F. Shaver
Attorney, Agent, or Firm—Donald W. Spurrell; Daniel B. Reece, III

[57] ABSTRACT

Disclosed is a process for coupling a disperse dye diazo component selected from diazonium salts of substituted and unsubstituted phenyl, 2-thiazolyl, 2-benzothiazolyl, 1,3,4-thiadiazol-2-yl, 1,2,4-thiadiazol-5-yl, 2,1-benzisothiazol-3-yl, isothiazol-5-yl, 1,3,4-triazol-2-yl, pyrazol-5-yl, imidazol-2-yl, phthalimid-3 or 4-yl, 1-naphthyl, and 2-thienyl radicals comprising reacting with said component a disperse dye coupler having in the coupling position on the ring a substituent typified by —CHO, —COOH, —COCH$_3$, —SO$_3$H, displaceable diazonium radicals including the above, and another or the same coupler linked to said coupler by certain bivalent radicals.

6 Claims, No Drawings

PROCESS FOR PREPARING AZO DYES

This invention concerns an improved method for carrying out the coupling of diazonium dye components with disperse dye type aniline, tetrahydroquinoline, and benzomorpholine couplers.

The preparation of azo disperse dyes, for example, from aniline type couplers, typically involves the reaction of a diazonium component with the aromatic amine at the position para to the amino group according to the reaction

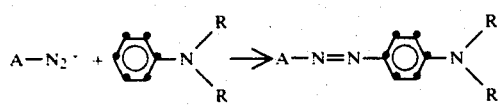

wherein A represents an aromatic or heterocyclic component and R is hydrogen or any of a large variety of substituents such as alkyl, cycloalkyl, alkaryl, and the like.

Many azo dyes which otherwise are highly commercially acceptable are difficult to produce in good yields and purity, and the present invention has as its objective to provide a method for improving the yield and purity of azo dyes through modification of the coupling reactions, particularly with regard to those coupling reactions normally proceeding poorly to give impure products in low yield. This and other objectives hereinafter appearing have been attained through the discovery of novel coupling procedures hereinafter described in detail.

In the coupling reaction depicted above the coupling component typically may be substituted in the 2, 3, 5 or 6 positions but never in the 4 position since this is the position where electrophilic attack occurs, and according to standard coupling procedure must remain unencumbered. It has been discovered however in accordance with the present invention, that if a substituent hereinafter defined is introduced into the coupling position, coupling takes place by elimination of the substituent, resulting in formation of the same dye as would have been produced had the substituent not been present. The exact mechanism of the reaction is uncertain and the form in which the coupling position substituent is eliminated is unclear.

Surprisingly, with the substituent in the coupling position, the yield and purity of the azo dye produced can be very much higher than if no such substituent were present. This effect cannot be satisfactorily explained and is most unexpected. It would normally be assumed that if a substituent is required to be eliminated, the efficiency of the reaction would be less than if no substituent were there at all. This has been shown to be quite untrue and yields can be much improved in cases where such substitution is needed because of normally low yields. Also, one would assume that blocking of the coupling position would lead to side reactions between the reactive species present, or to decomposition of the diazo component resulting in a more impure product, but, in fact the opposite effect is observed and the purity of the dye prepared is improved.

The present invention is defined broadly as a process for coupling a disperse dye diazo component selected from substituted and unsubstituted phenyl, 2-thiazolyl, 2-benzothiazolyl, 1,3,4-thiadiazol-2-yl, 1,2,4-thiadiazol-5-yl, 2,1-benzisothiazol-3-yl, isothiazol-5-yl, 1,3,4-triazol-2-yl, pyrazol-5-yl, imidazol-2-yl, phthalimid-3 or 4-yl, 1-naphthyl, and 2-thienyl diazonium salts with disperse dye couplers comprising carrying out the coupling with a disperse dye coupler having in the coupling position on the ring a displaceable substituent. The terms "diazotization" and "coupling" as used herein and in the claims mean the well known reactions of forming a diazonium salt of an amine compound and reacting it with a coupler. The diazotization and coupling may be carried out in conventional aqueous acid system or in an organic solvent system such as acetonitrile, propionitrile and tetrahydrothiophene-1,1-dioxide. See British Pat. No. 1,507,758, incorporated herein by reference, for further details of these non-aqueous systems. The Examples 1 and 3 below describe in detail the typical manner of diazotizing and coupling. In a more preferred sense the invention is defined as stated above wherein the displaceable substituent is selected from —COOH, —CH₂OH, —SO₃H, RCO— wherein R is selected from —H, straight and branched alkyl of 1–6 carbons, phenyl and phenyl substituted with 1–3 alkyl groups of 1–6 carbons, —Cl, —Br and —I,

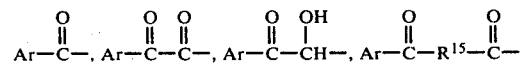

and Ar—R¹⁷— where Ar is an aniline, tetrahydroquinoline, or benzomorpholine coupler which may be the same or different from the coupler to which this substituent is attached (hereinafter termed "bis-couplers"), $R^{15}$ is a group selected from alkylene of 1–6 carbons, phenylene and cycloalkylene of 4–8 carbons, and $R^{17}$ is selected from straight and branched alkylene of 1–6 carbons, and from the groups

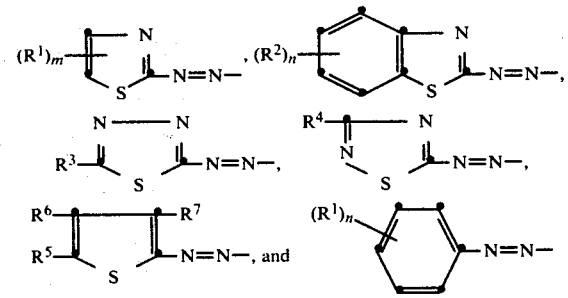

wherein $R^1$ is hydrogen, lower alkyl, lower alkoxy, cyano, nitro, halogen, lower alkylsulfonyl, or lower alkoxycarbonyl; $R^2$ is hydrogen, lower alkyl, lower alkoxy, cyano, nitro, lower alkylsulfonyl, lower alkoxycarbonyl, trifluoromethyl, or thiocyanato; $R^3$ is lower alkyl, lower alkoxy, lower alkylthio, cyclohexylthio, phenylthio, lower alkylsulfonyl, or lower alkoxycarbonyl; $R^4$ is lower alkyl, lower alkoxy, lower alkylthio or lower alkylsulfonyl; $R^5$ is lower alkyl, lower alkoxy, nitro, lower alkanoyl, benzoyl, lower alkylbenzoyl, lower alkoxybenzoyl, halobenzoyl, or nitrobenzoyl; $R^6$ is hydrogen, lower alkyl, lower alkoxy, cyano, lower alkanoyl, aryl, substituted aryl, or alkyl; $R^7$ is hydrogen, lower alkyl, lower alkoxy, cyano, nitro, carbamoyl, substituted carbamoyl, or carboalkoxy; m is 1 or 2 and n is 1–3.

Referring to the above $R^1$–$R^7$, examples of these groups are methyl, ethyl, isopropyl, propyl, butyl, methoxy, ethoxy, propoxy, butoxy, methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, acetamido, propionamido, methylsulfonamido, ethylsulfonamido, butylsulfonamido, dimethylsulfamoyl, ethylsulfamoyl, butylsulfamoyl, diethylcarbamoyl, propylcarbamoyl, dibutylcarbamyl, phenyl and phenyl substituted with such radicals as tolyl, anisyl, chlorophenyl, bromophenyl, m-nitrophenyl, benzoyl, p-tolyl, p-chlorobenzoyl, p-nitrobenzoyl, p-ethoxyphenylthio, p-chlorobenzylthio, benzamido, p-tolylamino, p-tolysulfonyl, p-ethoxyphenylsulfonyl, benzylthio and p-chlorobenzothio.

The diazo moieties of the disperse dyes prepared according to the present invention include the same ones above which may act as the displaceable substituents on the couplers and include (the —N=N— group is assumed in naming these components) for example, 2-thiazolyl, 5-nitro-2-thiazolyl, 5-bromo-2-thiazolyl, 5-thiocyanato-2-thiazolyl, 4-trifluoromethyl-2-thiazolyl, 4-ethoxycarbonyl-2-thiazolyl, 5-cyano-2-thiazolyl, 5-acetamido-2-thiazolyl, 4-methylsulfonyl-2-thiazolyl, 4-methyl-5-nitro-2-thiazolyl, 2-benzothiazolyl, 6-methylsulfonyl-2-benzothiazolyl, 6-ethoxycarbonyl-2-benzothiazolyl, 6-cyano-2-benzothiazolyl, 6-sulfamoyl-2-benzothiazolyl, 6-thiocyanato-2-benzothiazolyl, 6-N,N-dimethylsulfamoyl-2-benzothiazolyl, 4,6-dichloro-2-benzothiazolyl, 4-methyl-6-nitro-2-benzothiazolyl, 5-methyl-1,3,4-thiadiazol-2-yl, 5-thiocyanato-1,3,4-thiadiazol-2-yl, 5-cyclohexylthio-1,3,4-thiadiazol-2-yl, 5-ethylthio-1,3,4-thiadiazol-2-yl, 5-phenylthio-1,3,4-thiadiazol-2-yl, 5-acetamido-1,3,4-thiadiazol-2-yl, 5-chloro-1,3,4-thiadiazol-2-yl, 5-beta-cyanoethylthio-1,3,4-thiadiazol-2-yl, 5-ethoxycarbonylmethylthio-1,3,4-thiadiazol-2-yl, 5-phenylsulfonyl-1,3,4-thiadiazol-2-yl, 3-methylsulfonyl-1,2,4-thiadiazol-5-yl, 3-butylthio-1,2,4-thiadiazol-5-yl, 5-benzoyl-3-nitro-2-thienyl, 3-nitro-5-p-toluoyl-2-thienyl, 3,5-di(methylsulfonyl)-2-thienyl, 5-methylsulfonyl-3-nitro-2-thienyl, 5-ethylsulfamoyl-3-nitro-2-thienyl, 3-nitro-2-thienyl, 3,5-dinitro-2-thienyl, 5-ethoxycarbonyl-2-thienyl, 2-cyano-4-nitrophenyl, 2,4-dinitro-6-cyano, 2,6-dicyano-4-nitrophenyl, 2,6-dicyano-4-chlorophenyl, 2-cyano-4-chlorophenyl, and 2-cyano-4-bromophenyl.

Preferred such diazoniums are selected from

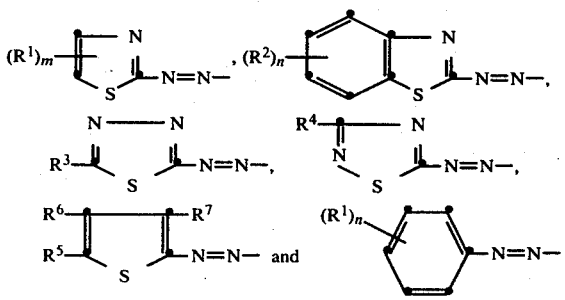

wherein R¹ is hydrogen, lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thio-cyanato, trifluoromethyl, phenyl or substituted phenyl; R² is hydrogen, lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl; R³ is hydrogen, lower alkyl, lower alkoxy, halogen, lower alkylthio, benzylthio, cyclohexylthio, phenylthio, substituted phenylthio, phenyl, substituted phenyl, benzyl, lower alkylsulfonyl, lower alkanoylamino, lower alkylsulfonamido, benzamido, lower alkoxycarbonyl, lower alkoxycarbonylalkylthio, thiocyanato, sulfamoyl, or lower alkylsulfamoyl; R⁴ is lower alkyl, lower alkylthio, lower alkoxy, halogen, cyclohexylthio, benzylthio, or lower alkylsulfonyl; and R⁵ is lower alkanoyl, lower alkoxy, benzoyl, lower alkylbenzoyl, lower alkoxybenzoyl, halobenzoyl, lower alkyl, halogen, thiocyanato, arylazo, nitrobenzoyl, NO₂, or a group which R⁷ can represent; R⁶ is hydrogen, lower alkyl, lower alkoxy, cyano, lower alkanoyl, aryl-lower alkyl or aryl; and R⁷ is hydrogen, lower alkyl, lower alkoxy, cyano, aryl, lower alkanoyl, aroyl, carbamoyl, carbalkoxy, NO₂, lower alkoxycarbonyl, lower hydroxyalkoxycarbonyl, lower alkoxy-lower-alkoxycarbonyl, or the group —CONR¹³R¹⁴ in which R¹³ individually is hydrogen, lower alkyl, cyclohexyl, lower alkylcyclohexyl, cyclohexylmethyl, lower alkylcyclohexylmethyl, lower hydroxyalkylcyclohexylmethyl, aryl-lower-alkyl, or aryl; R¹⁴ individually is hydrogen or lower alkyl; and R¹³ and R¹⁴ in combination are pentamethylene or ethyleneoxyethylene; m is 1 or 2 and n is 1-3. The term "lower", as used herein, means 1 to 6 carbons. Particularly preferred diazos are where R¹ is cyano, nitro, lower alkylsulfonyl, or lower alkoxycarbonyl; R² is cyano, nitro, lower alkylsulfonyl, lower alkoxycarbonyl, trifluoromethyl, or thiocyanato; R³ is lower alkyl, lower alkylthio, cyclohexylthio, phenylthio, lower alkylsulfonyl, or lower alkoxycarbonyl; R⁴ is lower alkylthio or lower alkylsulfonyl; R⁵ is nitro, lower alkanoyl, benzoyl, lower alkylbenzoyl, lower alkoxybenzoyl, halobenzoyl, or nitrobenzoyl; R⁶ is hydrogen, cyano, lower alkanoyl, aryl or substituted aryl; and R⁷ is hydrogen, nitro, lower alkyl, lower alkanoyl, carbamoyl, substituted carbamoyl, carboalkoxy, or alkoxy.

Typical 3-amino-2,1-benzisothiazoles useful herein as their diazonium salts are shown in U.S. Pat. No. 4,070,352, incorporated herein by reference, and may be substituted for example with the typical groups such as one or more lower alkyl, lower alkoxy, chlorine or bromine. Typical useful 5-aminoisothiazoles are shown for example in British Pat. No. 1,379,233, and German Pat. No. 2,209,839, 2-amino-1,3,4-triazoles in U.S. Pat. No. 3,928,311, 5-aminopyrazoles in U.S. Pat. No. 4,065,447, 2-aminoimidazoles in U.S. Pat. No. 4,097,475, 3 or 4 phthalimidyl diazo compounds in U.S. Pat. No. 4,039,522, and naphthyl diazo moieties in British Pat. No. 1,510,069, the disclosures of all of these patents being incorporated herein by reference.

The couplers to which the present invention is applicable are the aniline, tetrahydroquinoline and benzomorpholine types which may be substituted as common to the dye art and typified in the examples below. Some of the more applicable aniline couplers have the formula

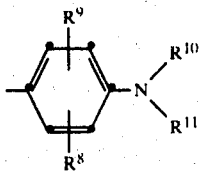

in which $R^8$ and $R^9$ can be hydrogen or a wide variety of halogen, unsubstituted and substituted alkyl, alkoxy, alkylthio, arylthio and acylamido radicals. Such acylamido groups include those having the formula —NH—X—$R^{12}$ in which X is —CO—, —COO—, or —SO$_2$— and $R^{12}$ is unsubstituted or substituted alkyl, cycloalkyl, or aryl or when X is —CO—, $R^{12}$ also can be amino, alkylamino, dialkylamino, arylamino, or furyl. $R^{12}$ is typified by lower alkyl and lower alkyl substituted, for example, with halogen, aryl, cyano, lower alkylsulfonyl, hydroxy, lower alkylthio, lower alkanoyloxy, and the like. $R^{12}$ can also be such groups as cyclohexyl, lower alkyl-substituted cyclohexyl, methylamino, ethylamino, and butylamino. Typical groups for —X—$R^{12}$ are acetyl, propionyl, butyryl, cyanoacetyl, chloroacetyl, bromoacetyl, trifluoroacetyl, phenylacetyl, methoxyacetyl, ethylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, 2-chloroethylsulfonyl, cyclohexoyl, 4-ethylcyclohexoyl, benzoyl, 4-ethylbenzoyl, 4-cyanobenzoyl, 4-ethoxycarbonylbenzoyl, phenoxycarbonyl, 2,4-dichlorophenoxycarbony, 4-bromophenoxycarbonyl, 4-acetamidophenoxycarbonyl, benzenesulfonyl, p-toluenesulfonyl, 4-propionamidophenylsulfonyl, 4-chlorophenylsulfonyl, cyclohexyloxycarbonyl, 4-butylcyclohexylsulfonyl, ethylcarbamoyl, butylsulfamoyl, phenylcarbamoyl, p-tolylcarbamoyl, p-anisylcarbamoyl, and phenylsulfamoyl.

The alkyl and alkoxy groups which can be present on the coupler ring are typically methyl, ethyl, methoxy, ethoxy and butoxy. Phenoxy, p-tolyloxy, p-ethoxyphenoxy, methylthio, ethylthio, butylthio, phenylthio, n-acetamidophenylthio, and p-chlorophenylthio are typical aryloxy, alkylthio and arylthio groups which can be present on the coupler ring. When $R^8$ and $R^9$ both represent substituents on the aniline-coupler, it is generally preferred that they be in a para relationship with each other.

$R^{10}$ and $R^{11}$ can represent for example, unsubstituted or substituted alkyl of up to about eight or more carbon atoms, cycloalkyl such as the cycloalkyl groups represented by $R^{12}$, or aryl. The groups which can be substituted on the alkyl radicals of $R^{10}$ and $R^{11}$ include hydroxy, lower alkoxy, lower alkoxyalkoxy, halogen, cyano, succinimido, glutarimido, phthalimido, cyclohexyl, aryl, and groups having the formula —NH—X—$R^{12}$, —X—$R^{12}$, —OCO—$R^{12}$, —OCOO—$R^{12}$, —CONR$^{13}$R$^{14}$ and —SO$_2$NR$^{13}$R$^{14}$ wherein $R^{13}$ individually is hydrogen, lower alkyl, cyclohexyl, lower alkylcyclohexyl, cyclohexylmethyl, lower alkylcyclohexylmethyl, lower hydroxyalkylcyclohexylmethyl, aryllower-alkyl, or aryl, $R^{14}$ individually is hydrogen or lower alkyl, and $R^{13}$ and $R^{14}$ in combination are pentamethylene or ethyleneoxyethylene. $R^{10}$ and $R^{11}$ also can represent a single, combined group which, with the nitrogen atom to which each is attached, forms a ring. Examples of such combined groups include pentamethylene, ethyleneoxyethylene, and ethylenesulfonylethylene.

Particularly useful coupling components are those wherein $R^8$ is hydrogen, lower alkyl, lower alkoxy, halogen, lower alkanoylamino, lower alkoxycarbonylamino, or benzamido; $R^9$ is hydrogen, lower alkoxy, or when $R^{11}$ is hydrogen, $R^9$ is lower alkyl; $R^{10}$ is cyclohexyl, lower alkyl, lower alkyl substituted with hydroxy, lower alkoxy, cyano, carbamoyl, lower alkylcarbamoyl, lower dialkylcarbamoyl, lower alkanoylamino, lower alkoxycarbonylamino, lower alkanoyloxy, 2-pyrrolidinono, or lower alkoxycarbonyl; $R^{11}$ is hydrogen, lower alkyl, or lower alkyl substituted with hydroxy, lower alkoxy, lower alkanoyloxy, or lower alkoxycarbonyl, and $R^{10}$ and $R^{11}$ in combination are pentamethylene or ethyleneoxyethylene.

Useful tetrahydroquinoline and benzomorpholine couplers have the formulae

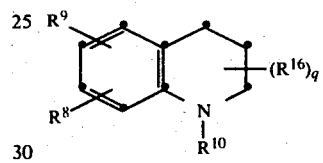

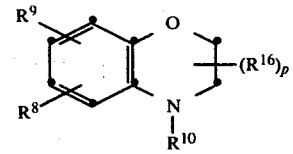

wherein $R^8$, $R^9$, and $R^{10}$ are as defined above and $R^{16}$ is methyl, p is 0, 1 or 2, and q is 0, 1, 2 or 3.

Specific ones, for example, of these couplers are

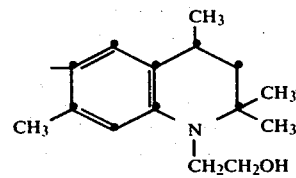

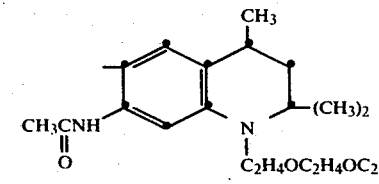

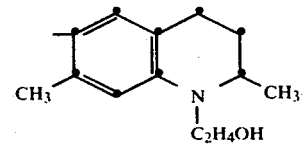

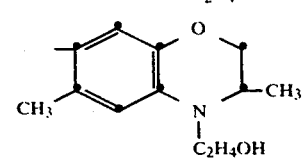

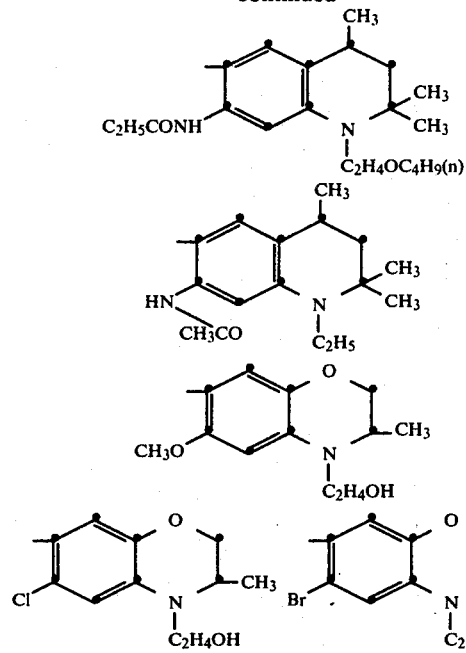
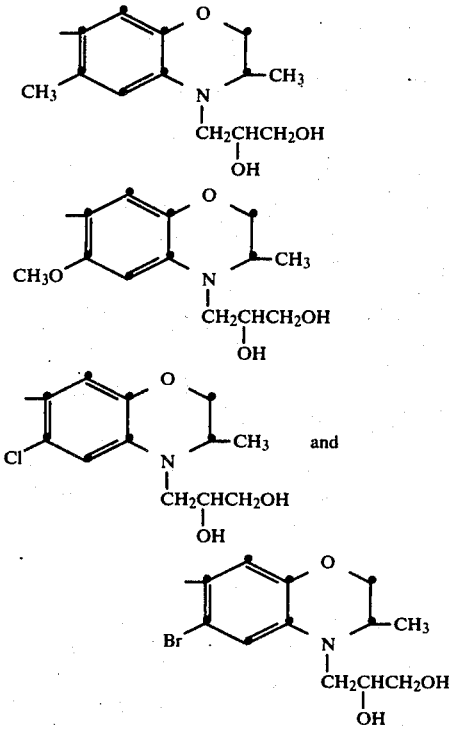
The bis-couplers are exemplified by the following:
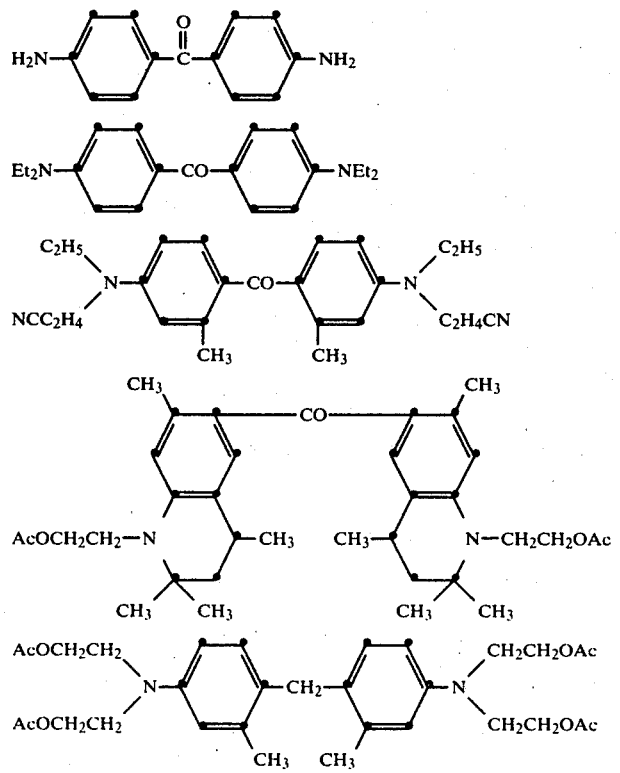

-continued

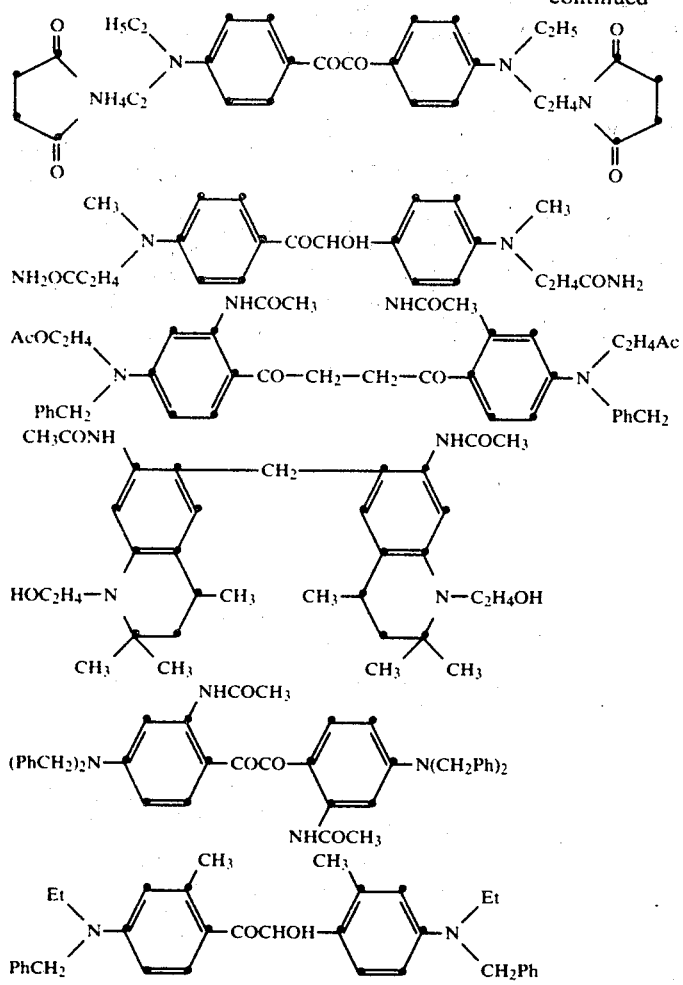

The preparation of the diazoniums, typically through the reaction with excess nitrous acid or the like such as nitrosyl sulfuric at low temperature to form the electrophilic ion $AN_2^+$ is disclosed in the literature e.g., Advanced Organic Chemistry, Fieser & Fieser, pages 736–740, Library of Congress Catalog Card No. 61-14594, and in a large number of patents which disclose diazoniums and couplers which may be substituted in the coupling position for use in preparing dyes according to the present invention. These patents, incorporated herein by reference, are as follows:

| | | |
|---|---|---|
| 2,469,682 | 2,615,013 | 2,746,953 |
| 2,470,094 | 2,618,631 | 2,771,466 |
| 2,491,481 | 2,649,440 | 2,773,054 |
| 2,492,971 | 2,659,719 | 2,785,157 |
| 2,516,106 | 2,683,708 | 2,790,791 |
| 2,516,107 | 2,683,709 | 2,805,218 |
| 2,516,302 | 2,708,671 | 2,827,450 |
| 2,516,303 | 2,726,237 | 2,835,661 |
| 2,590,092 | 2,726,247 | 3,639,385 |
| 2,594,297 | 2,730,523 | |

This invention will be further illustrated by the following examples although it will be understood that these examples are included merely for purposes of illustration and are not intended to limit the scope of the invention. The diazotization and coupling procedures of Examples 1 and 3 below are examples of general procedures applicable to all of the dyes. the various reactants, solvents and their proportions can obviously be varied.

EXAMPLE 1

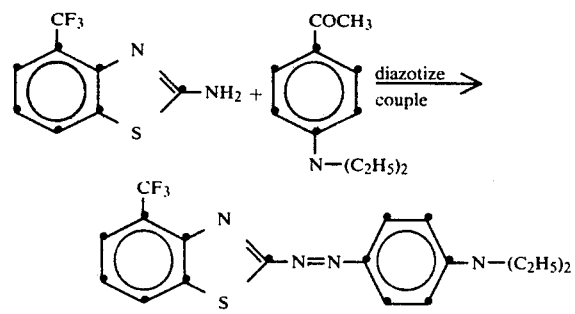

Nitrosyl sulphuric acid prepared from 0.72 g of $NaNO_2$ in 5 g of conc. $H_2SO_4$ was added to a solution of 2-amino-4-trifluoromethylbenzothiazole (2.18 g) in 85% by weight phosphoric acid (20 g) in water. The amine was allowed to diazotize for two hours and the solution was added to a solution of 4-diethylaminoacetophenone in ice cold dilute sulphuric acid. A red solid dye was precipitated which was filtered, washed with water and dried. The yield of the dye was 3.6 g (95%) and the structure was shown to be as given above by spectroscopy and comparison with an authenticated sample prepared conventionally. The conventional preparation was carried out by diazotizing 2-amino-4-trifluoromethylbenzothiazole in an identical manner to that described above and coupling with N,N-diethylaniline in ice cold dilute sulphuric acid. A red dye was precipitated, filtered, washed with water and dried. The yield of dye was 3.4 g (90%).

The two samples prepared above were assayed by comparison of $E_1^1$ of the visible absorption spectra at the wavelength of maximum absorption with a highly pure sample of the same dye purified by chromatographic techniques and crystallization. The purity of the first sample prepared according to the invention was 82% (assay yield 80%) and the purity of the second sample prepared conventionally was 66% (assay yield 60%).

EXAMPLE 2

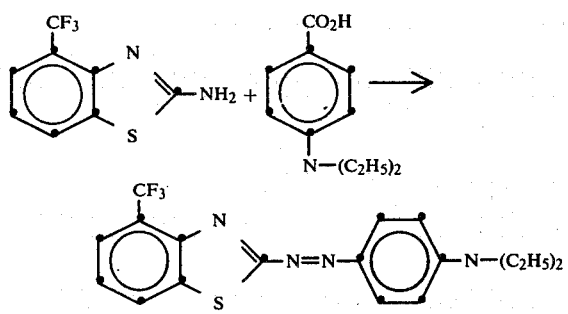

The diazotization and coupling of 2-amino-4-trifluoromethylbenzothiazole were carried out in an identical manner to that described in Example 1 except that 4-diethylamino benzoic acid was used as the coupling component. The dye produced was identified as being identical to that produced in Example 1. The yield of dye was 3.55 g (94%) and the purity assay indicated it to be 80% pure.

EXAMPLE 3

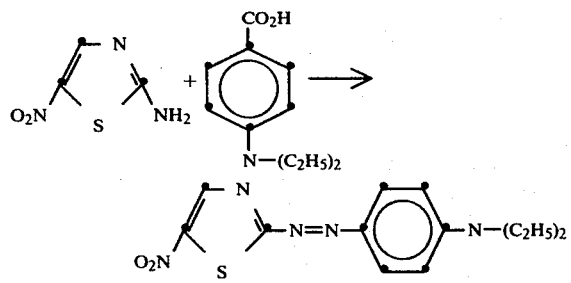

Sodium nitrite (2.2 g) was dissolved in conc. sulphuric acid (15 ml) at 70° C. and the mixture cooled below room temperature. A mixture of propionic acid and acetic acid (30 ml) in the ratio 1:5 was added maintaining the temperature below 20° C. The mixture was cooled to <5° C. and 2-amino-5-nitrothiazole (4.35 g) was added followed by a further portion of 1:5 acid (30 ml). Diazotization was allowed to proceed for two hours at <5° C. and the resulting diazonium solution was added dropwise to a solution of 4-diethylaminobenzoic acid in dilute sulphuric acid. The dye was precipitated immediately and was filtered and washed with water. Thin layer chromatography indicated the dye to be in a very pure state. The yield was 6.5 g (71%).

In a similar preparation to Example 3 carried out substituting N,N-diethylaniline for the N,N-diethylaminobenzoic acid in the above coupling, the dye is produced in very low yield and is extremely impure. After considerable work, the best conditions found for preparing the dye from the N,N-diethylaniline coupler was found to be to use ethanol as the coupling solvent. All other solvents appeared to yield very impure products. Even using ethanol as the coupling solvent the best yield obtainable was 4.0 g (44%) and then the purity was lower than that of the dye produced in 71% yield by the method of the invention.

EXAMPLE 4

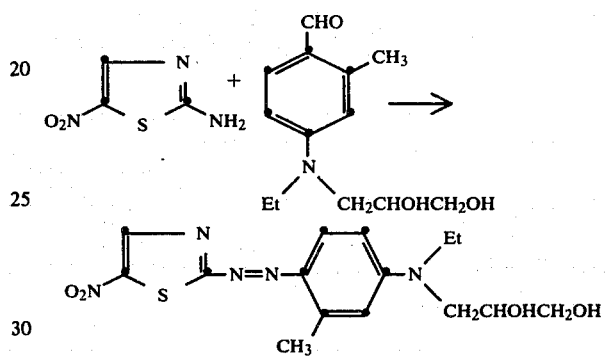

2-Amino-5-nitrothiazole was diazotized in 1:5 propionic:acetic acid as described in Example 3. The diazonium solution was added to a solution of the coupler, 3-methyl-4-formyl-N-ethyl-N-2,3-dihydroxy propyl aniline (7.1 g.) in dilute sulphuric acid. The azo dye was precipitated immediately and was filtered, washed with water and dried. The yield was 8.0 g. (73%).

A similar preparation where the coupling component was N-ethyl-N-2,3-dihydroxypropyl-m-toluidine (6.3 g.) in dilute sulphuric acid gave the same azo dye in 51% yield. The assays (purity) of the two dyes also indicated that the one produced by displacement of the formyl group was considerably higher than that produced conventionally.

EXAMPLE 5

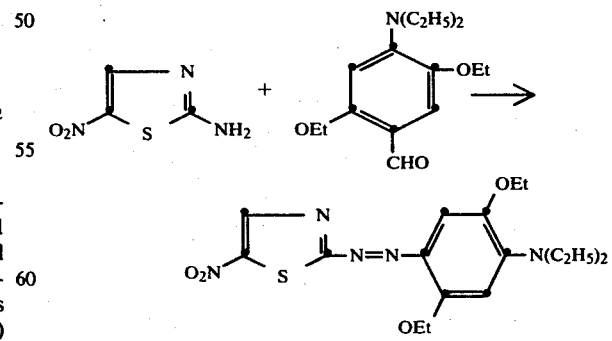

2-Amino-5-nitrothiazole (1.45 g., 0.01 mole) was diazotized as in Examples 3 and 4 in 1:5 propionic:acetic acid.

2,5-Diethoxy-4-formyl-N,N-di-n-propylaniline was prepared in situ by taking 2,5-diethoxy-N,N-di-n- propylaniline (2.65 g., 0.01 mole) in a mixture of N,N-dimethylformamide (10 ml.) and phosphorus oxychloride (1.68 g., 0.011 mole) and heating on a steam bath for two hours. The mixture was then poured into ice water to give the coupling solution.

Diazotized 2-amino-5-nitrothiazole prepared as above was added to the aqueous solution of coupler and the solid azo dye precipitated immediately. The dye was filtered after 30 minutes, washed with water and dried. The yield was 2.0 g. (47%).

A similar experiment using 2,5-diethoxy-N,N-diethylaniline in place of the formylated coupler failed to give any isolable dye.

EXAMPLE 6

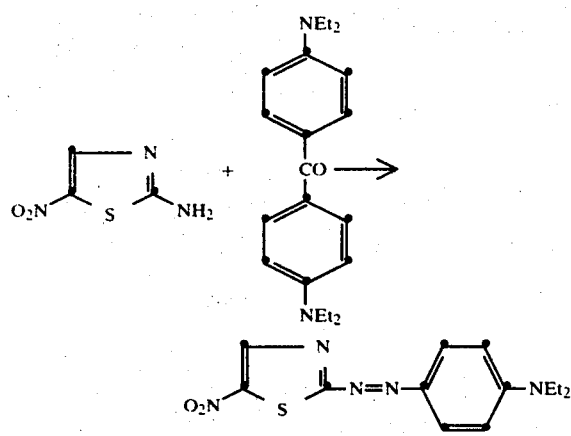

2-Amino-5-nitrothiazole (4.35 g., 0.03 mole) was diazotized as described in Examples 3 and 4 in 1:5 propionic-:acetic acids. The diazonium solution was added to a solution of 4,4'-bis-diethylaminobenzophenone (4.86 g., 0.015 mole) in dilute sulphuric acid. The azo dye was precipitated immediately and was filtered, washed with water and dried. The yield was 6.8 g. (74.3%). As described in Example 3, when diethylaniline was used conventionally the yield as very poor and even when special coupling conditions were employed the yield was only 44%.

The invention has been described in detail with particular reference to preferred embodiments thereof, but it will be understood that variations and modifications can be effected within the spirit and scope of the invention.

I claim:

1. The process for coupling a disperse dye diazo component selected from substituted and unsubstituted phenyl, 2-thiazolyl, 2-benzothiazolyl, 1,3,4-thiadiazol-2-yl, 1,2,4-thiadiazol-5-yl, 2,1-benzisothiazol-3-yl, isothiazol-5-yl, 1,3,4-triazol-2-yl, pyrazol-5-yl, imidazol-2-yl, phthalimid-3 or 4-yl, 1-naphthyl, and 2-thienyl diazonium salts with disperse dye couplers comprising carrying out the coupling with a disperse dye coupler having in the coupling position on the ring a displaceable substituent other than hydrogen.

2. The process of claim 1 comprising carrying out the coupling with a disperse dye coupler having in the coupling position on the ring a displaceable substituent selected from —COOH, —CH₂OH, —SO₃H,

wherein R is selected from —H, straight and branched alkyl of 1-6 carbons, phenyl and phenyl substituted with 1-3 alkyl groups of 1-6 carbons, —Cl, —Br, and —I,

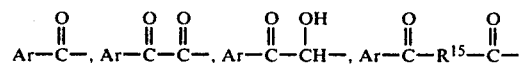

and Ar—R$^{17}$— where Ar is an aniline, tetrahydroquinoline, or benzomorpholine coupler which may be the same as the coupler to which this substituent is attached, or different therefrom, R$^{15}$ is a group selected from alkylene of 1-6 carbons, phenylene and cycloalkylene of 4-8 carbons, and R$^{17}$ is straight or branched alkylane of 1-6 carbons, and the groups

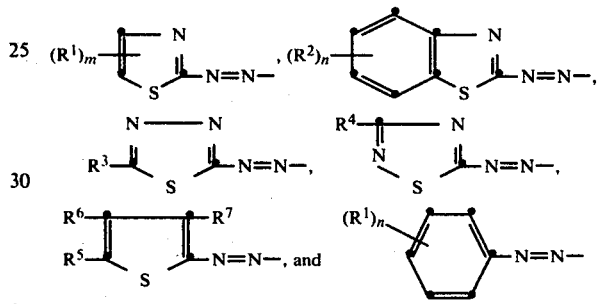

wherein R$^1$ is hydrogen, lower alkyl, lower alkoxy, cyano, nitro, halogen, lower alkylsulfonyl, or lower alkoxycarbonyl; R$^2$ is hydrogen, lower alkyl, lower alkoxy, cyano, nitro, lower alkylsulfonyl, lower alkoxycarbonyl, trifluoromethyl, or thiocyanato; R$^3$ is lower alkyl, lower alkoxy, lower alkylthio, cyclohexylthio, phenylthio, lower alkylsulfonyl, or lower alkoxycarbonyl; R$^4$ is lower alkyl, lower alkoxy, lower alkylthio or lower alkylsulfonyl; R$^5$ is lower alkyl, lower alkoxy, nitro, lower alkanoyl, benzoyl, lower alkylbenzoyl, lower alkoxybenzoyl, halobenzoyl, or nitrobenzoyl; R$^6$ is hydrogen, lower alkyl, lower alkoxy, cyano, lower alkanoyl, aryl, substituted aryl, or alkyl; R$^7$ is hydrogen, lower alkyl, lower alkoxy, cyano, carbamoyl, substituted carbamoyl, or carboalkoxy; m is 1 or 2 and n is 1-3.

3. The process of claim 1 wherein said diazo component is selected from

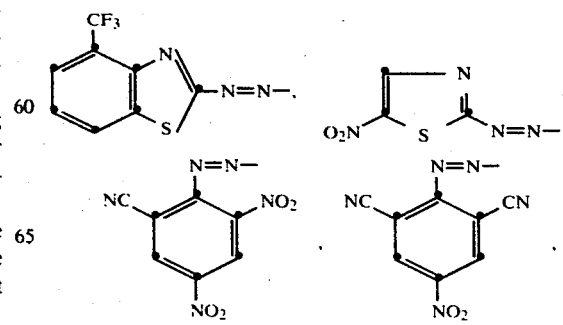

and 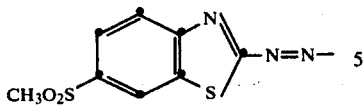

and the coupler is selected from

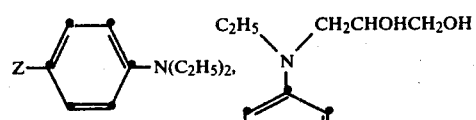

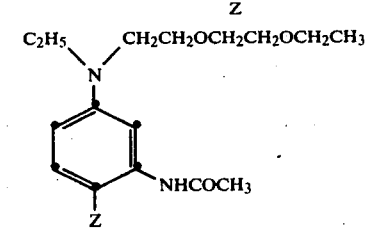

and

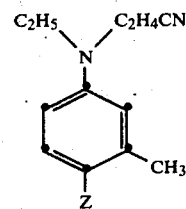

wherein Z is selected from —CHO, —COOH, —CH$_2$OH and —SO$_3$H.

4. The process of claim 1 wherein the diazo component is the diazonium salt of 4-trifluoromethyl-2-aminobenzothiazole, the coupler is N,N-diethylaniline, and the displaceable substituent is a carboxyl or formyl group.

5. The process of claim 1 wherein the diazo component is the diazonium salt of 5-nitro-2-aminothiazole, the coupler is N,N-diethylaniline, and the displaceable substituent is a carboxyl or formyl group.

6. The process of claim 1 wherein the diazo component is the diazonium salt of 5-nitro-2-aminothiazole, the coupler is 3-methyl-N-ethyl-N-2,3-dihydroxypropylaniline, and the displaceable substituent is a carboxyl or formyl group.

* * * * *